United States Patent
Zangi et al.

(10) Patent No.: US 8,223,896 B2
(45) Date of Patent: Jul. 17, 2012

(54) SOFT BIT VALUE GENERATION IN A SEQUENCE ESTIMATOR

(75) Inventors: Kambiz Zangi, Chapel Hill, NC (US);
Rajaram Ramesh, Raleigh, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 435 days.

(21) Appl. No.: 12/510,537

(22) Filed: Jul. 28, 2009

(65) Prior Publication Data

US 2011/0026647 A1   Feb. 3, 2011

(51) Int. Cl.
*H04L 27/06* (2006.01)
(52) U.S. Cl. ........................... 375/341; 375/262
(58) Field of Classification Search ............ 375/233, 375/267, 341, 265, 346–350
See application file for complete search history.

(56) References Cited

U.S. PATENT DOCUMENTS

| | | | |
|---|---|---|---|
| 2003/0053535 A1 | 3/2003 | Malkov et al. | |
| 2005/0286659 A1* | 12/2005 | Abe et al. | 375/341 |
| 2006/0146950 A1* | 7/2006 | Hoo | 375/267 |
| 2007/0147548 A1* | 6/2007 | Dominique et al. | 375/341 |
| 2008/0069199 A1* | 3/2008 | Chen et al. | 375/233 |
| 2008/0130775 A1* | 6/2008 | Hum et al. | 375/262 |
| 2008/0279298 A1 | 11/2008 | Ben-Yishai et al. | |
| 2009/0132897 A1* | 5/2009 | Xu et al. | 714/796 |
| 2011/0044412 A1* | 2/2011 | Murakami et al. | 375/347 |

OTHER PUBLICATIONS

Abdel-Samad, Ayman A. : "Low-Complexity Soft-Output Reduced-State Equalization for EDGE", Wireless Communication Systems, 2007. ISWCS 2007. 4th International Symposium ON, IEEE, Piscataway, NJ, USA, Oct. 1, 2007.

* cited by examiner

Primary Examiner — Emmanuel Bayard

(57) ABSTRACT

Teachings presented herein offer reduced computational complexity for symbol sequence estimation, and also provide for the generation of soft bit values representing the reliability of that estimation. A demodulator is configured to generate these soft bit values by identifying a candidate value for each symbol in the sequence which is more likely than at least one other in a defined set of candidate values. Based on the candidate value identified for each symbol, the demodulator forms a reduced set of candidate values for the symbol by selecting as many additional candidate values from the defined set as are needed to have complementary bit values for each bit value in that identified candidate value. The demodulator calculates soft bit values for the symbol sequence based on a sequence estimation process whose state space for each symbol is constrained to the corresponding reduced set.

18 Claims, 5 Drawing Sheets

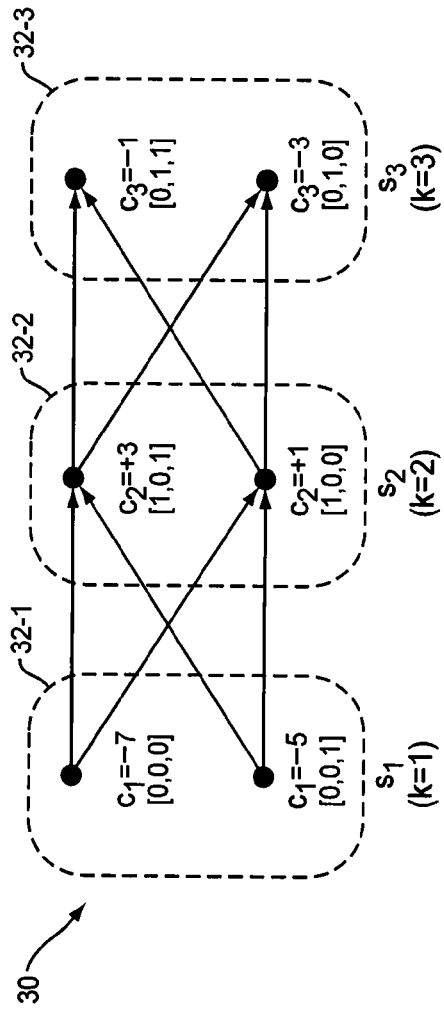
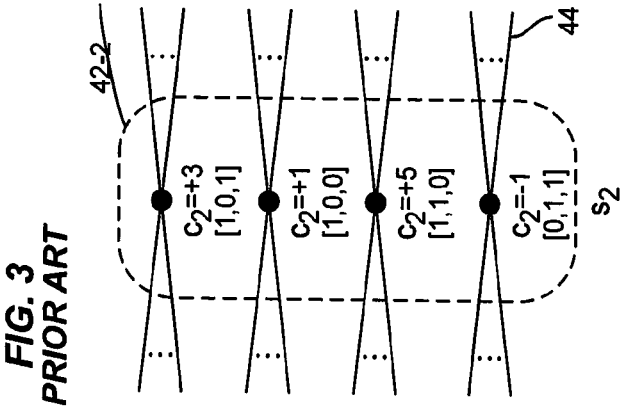
FIG. 2
| $b_0$ | $b_1$ | $b_2$ | $s_k$ |
|---|---|---|---|
| 0 | 0 | 0 | -7 |
| 0 | 0 | 1 | -5 |
| 0 | 1 | 0 | -3 |
| 0 | 1 | 1 | -1 |
| 1 | 0 | 0 | +1 |
| 1 | 0 | 1 | +3 |
| 1 | 1 | 0 | +5 |
| 1 | 1 | 1 | +7 |
FIG. 3 PRIOR ART
FIG. 4
| RANK (IN ORDER OF LIKELIHOOD) | $c_2$ | COMPLEMENTARY BIT VALUE | | |
|---|---|---|---|---|
| | | $b_0$ | $b_1$ | $b_2$ |
| 1 | +3 | 1 | 0 | 1 |
| 2 | +1 | N | N | Y |
| 3 | +5 | N | Y | Y |
| 4 | -1 | Y | Y | N |
| 5 | +7 | N | Y | N |
| 6 | -3 | Y | Y | Y |
| 7 | -5 | Y | N | N |
| 8 | -7 | Y | N | Y |

SOFT BIT VALUE GENERATION IN A SEQUENCE ESTIMATOR

TECHNICAL FIELD

The present invention relates generally to symbol detection and particularly to generating soft bit values using a sequence estimator.

BACKGROUND

A sequence estimator, as a form of equalizer, processes a sequence of information symbols that has been received over a dispersive channel with inter-symbol interference. A Maximum Likelihood Sequence Estimator (MLSE), for example, operates on a trellis of possible sequences to determine the most likely path associated with the received sequence. The computational complexity of an MLSE, however, becomes particularly burdensome with an increasing number of possible paths represented by the sequence (which is a function of the sequence length, as well as the number of possible symbol values).

To reduce computational complexity, some sequence estimators eliminate certain paths from sequence estimation. In particular, Generalized MLSE Arbitration (GMA) greatly reduces the number of possible paths considered by an MLSE through use of a two-pass demodulation process. The first pass identifies a reduced set of possible values for each symbol in the sequence, such as by detecting the most likely possible values out of all possible values defined by the modulation constellation. The state space for each symbol in the second pass is then constrained to the reduced set identified for that symbol in the first pass. Accordingly, an MLSE in the second pass considers fewer paths of possible symbol sequences in detecting the received sequence. For a more detailed discussion of GMA, see U.S. patent application Ser. No. 12/035,932, which is co-owned with the instant application.

With a reduced state space, however, these sequence estimators can produce insufficient reliability, or soft, information about the bits detected. In fact, some of the states used to generate this soft information (e.g., those corresponding to a bit value other than that detected) may be missing from the trellis entirely. Thus, although eliminating paths during sequence estimation reduces computational complexity, such compromises the additional error correcting performance obtained from soft information.

SUMMARY

Teachings presented herein offer reduced computational complexity for symbol sequence estimation, and also provide for the generation of soft information about the bits detected. These teachings constrain the state space for each symbol to a reduced number of possible symbol values, but include in the state space those possible symbol values used to generate soft information.

More particularly, a demodulator as taught herein is configured to generate soft bit values for a symbol sequence in a received signal. Each symbol in the sequence may have any one of a number of possible values (referred to as "candidate values"), the set of which is defined by the modulation constellation used to form the symbols for transmission. A first pass demodulator included in the demodulator identifies a candidate value for each symbol in the sequence which is more likely than at least one other in the defined set of candidate values. Based on the candidate value identified for each symbol, a state space reduction circuit also included in the demodulator forms a reduced set of candidate values for the symbol by selecting as many additional candidate values from the defined set as are needed to have complementary bit values for each bit value in the corresponding identified candidate value. Accordingly, while still reduced with respect to the defined set, the reduced set is large enough so that every bit value in each candidate value in the set has a respective, but complementary bit value in at least one other candidate value in the set.

This reduced set of candidate values for a symbol serves as the state space of that symbol in a second pass demodulator, which may comprise an MLSE. Constrained to a reduced state space for each symbol, the second pass demodulator considers fewer paths of possible sequences, and thereby attains reduced computational complexity. Moreover, as every bit value in each candidate value in the set has a respective, but complementary bit value in at least one other candidate value in the set, the second pass demodulator calculates soft bit values for the symbol sequence. That is, when the second pass demodulator detects a symbol as having a given candidate value, it may generate a soft bit value for a bit in that detected symbol by comparing (1) the error resulting from that detection; and (2) the error that would have resulted had the demodulator detected the symbol as having a different candidate value; namely one that has a bit value for the respective bit that is complementary to that of the given candidate value.

In one embodiment, for example, the first pass demodulator ranks the candidate values of a symbol in order of their likelihood and identifies the first ranked candidate value as the most likely. Considering the first bit value in this first ranked candidate value, the state space reduction circuit identifies the highest ranked candidate value among those candidate values in the defined set that have a respective, but complementary bit value. If that candidate value is not already included in the reduced set, the state space reduction circuit appends it to the set. Otherwise, the state space reduction circuit continues this process for each bit value in the first ranked candidate value until there are no more. With the formed reduced set, the second pass demodulator calculates soft bit values for the symbol based on a sequence estimation process whose state space for the symbol is constrained to that reduced set.

Other embodiments herein contemplate that the reduction circuit includes more than just the first ranked candidate value in the reduced set to begin with. In this case, the state space reduction circuit identifies a number of the next most likely candidate values in the defined set, and selects them for inclusion in the reduced set. This number may be fixed, or adapted as a function of the candidate values' likelihood. In any case, processing may then continue as described above, wherein the state space reduction circuit still bases selection of further candidate values into the reduced set on the most likely candidate value.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a diagram of a defined set of candidate values for a symbol chosen from an example 8-ASK constellation.

FIG. 3 is a diagram of example state spaces in a trellis for prior reduced complexity sequence estimation processing.

FIG. 4 is a diagram of a defined set of candidate values for a symbol that is ranked according to one embodiment of the present invention, and an example state space in a trellis according to reduced complexity sequence estimation processing as taught herein.

DETAILED DESCRIPTION

Figure 1:
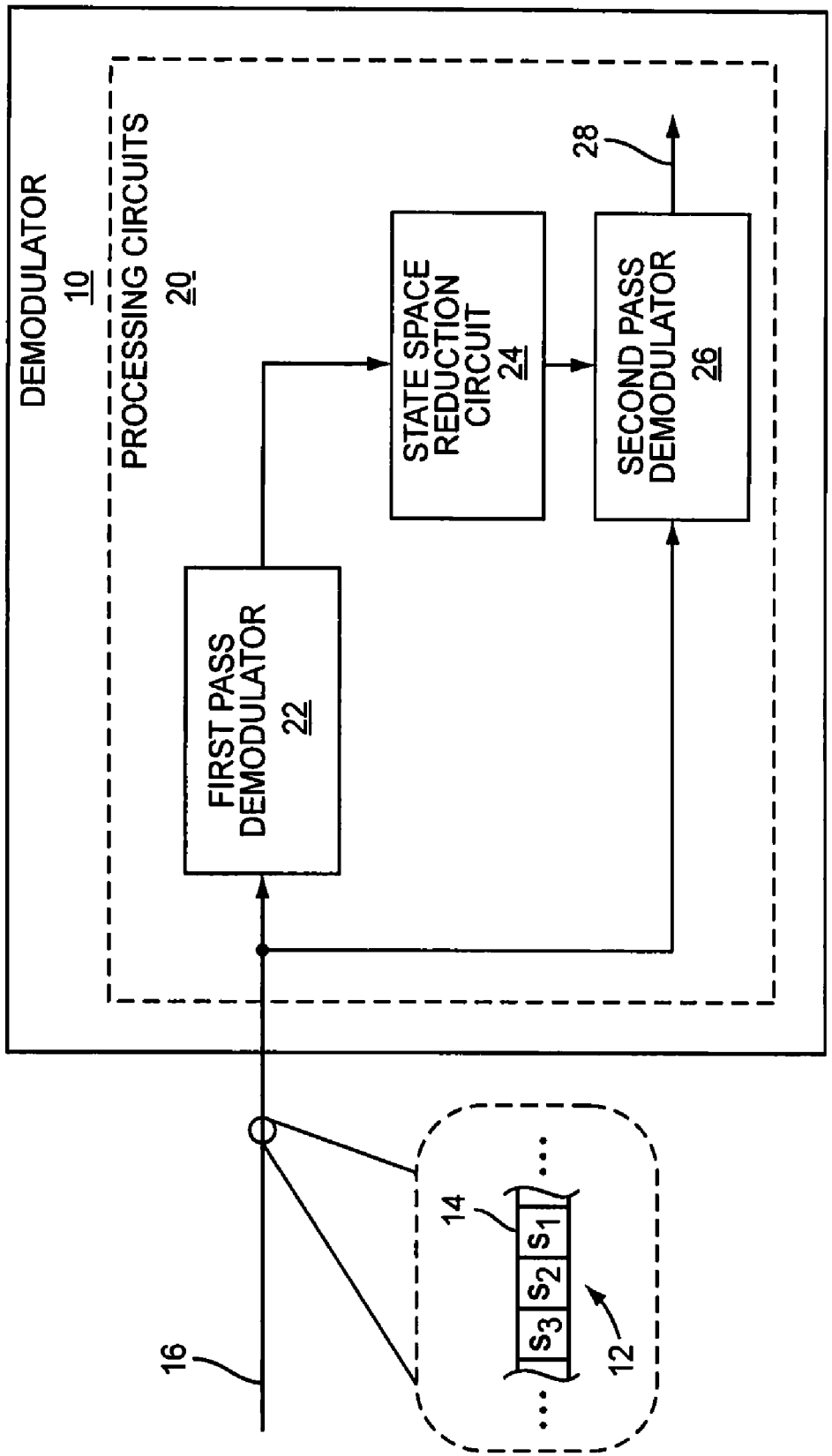
FIG. 1 is a block diagram of a demodulator according to one embodiment of the present invention.

FIG. 1 illustrates one embodiment of a demodulator 10 configured to detect a sequence 12 of information symbols 14 represented by a received signal 16. Each symbol 14 may have any one of a number of possible values (referred to herein as "candidate values"), the set of which is defined by the modulation constellation used to form the symbols for transmission. In detecting the value of each symbol 14 in the sequence 12, the demodulator 10 generates soft information about the reliability of that detection in the form of soft bit values 28. A soft bit value 28 is associated with a particular bit in a detected symbol and, in general, indicates the likelihood that the bit has one value over another. To generate these soft bit values 28, the demodulator 10 comprises one or more processing circuits 20, which include a first pass demodulator 22, a state space reduction circuit 24, and a second pass demodulator 26.

In some embodiments, the first pass demodulator 22 is implemented with a linear equalization-based demodulation process, such as with a Generalized-RAKE receiver or a Minimum Mean Square Error (MMSE) equalizer. The second pass demodulator 26 is implemented with a non-linear equalization-based demodulation process, such as with a Maximum Likelihood Sequence Estimator (MLSE).

However implemented, the first pass demodulator 22 identifies a candidate value for each symbol 14 in the sequence 12 which is more likely than at least one other in the defined set of candidate values. In one embodiment, for example, the first pass demodulator 22 determines the likelihood associated with each candidate value in the defined set and ranks them in order of likelihood. With the candidate values of a symbol 14 ranked in this way, the first pass demodulator 22 may identify any one except the last ranked or least likely candidate value. As described in more detail below, of course, the first pass demodulator 22 preferably identifies the first ranked or most likely candidate value. Regardless of the exact likelihood of the candidate values identified for the symbols 14, the first pass demodulator 22 provides those values to the state space reduction circuit 24.

Based on the candidate value identified for each symbol 14, the state space reduction circuit 24 forms a reduced set of candidate values for each symbol 14. (A reduced set is "reduced" in the sense that it contains fewer candidate values for a symbol than the set of candidate values defined by the modulation constellation.) The reduced set of candidate values for a symbol 14 serves as the state space of that symbol 14 in the second pass demodulator 26. Constrained to a reduced state space for each symbol 14, the second pass demodulator 26 considers fewer paths of possible sequences, and thereby attains reduced computational complexity. Notably, however, the state space reduction circuit 24 forms the reduced set of candidate values for each symbol 14, and thereby the state space of each symbol 14, to also facilitate soft bit value generation by the second pass demodulator 26.

In particular, the state space reduction circuit 24 forms the reduced set of candidate values for a symbol 14, from the candidate value identified for that symbol 14 by the first pass demodulator 22, by selecting as many additional candidate values from the defined set as are needed to have complementary bit values for each bit value in that identified candidate value. Accordingly, while still reduced with respect to the defined set, the reduced set is large enough so that every bit value in each candidate value in the set has a respective, but complementary bit value in at least one other candidate value in the set. As the second pass demodulator 26 constrains the state space of each symbol 14 to that symbol's corresponding reduced set, this property likewise holds true for each symbol's state space. Thus, when the second pass demodulator 26 detects a symbol 14 as having a given candidate value, it may generate a soft bit value 28 for a bit in that detected symbol 14 by comparing (1) the error resulting from that detection; and (2) the error that would have resulted had the demodulator 26 detected the symbol 14 as having a different candidate value; namely one that has a bit value for the respective bit that is complementary to that of the given candidate value.

It is helpful to consider the above soft value generation for an example sequence of three sequential 8-ASK symbols $s_k$, as shown in FIGS. 2-4, where k denotes the symbol time. In FIG. 2, each 8-ASK symbol $s_k$ has a defined alphabet of eight possible symbol values: −7, −5, −3, −1, +1, +3, +5, and +7. These possible symbol values correspond to the defined candidate values $c_k$ for each symbol $s_k$ in the example sequence.

FIG. 3 illustrates an example trellis 30 for prior reduced complexity sequence estimation processing of three 8-ASK symbols $s_k$. The symbols $s_k$ received at symbol times k=1, k=2, and k=3 are represented in the trellis 30 by a sequence of state spaces 32-1, 32-2, and 32-3. Each state space 32-$k$ is defined by a reduced number of candidate values $c_k$. As shown, this reduced number is fixed at two, although any fixed or variable number smaller than the symbol alphabet size (i.e., 8) may be used. One also sees that the candidate values $c_k$ for one symbol $s_k$ connect via branches 34 to other candidate values $c_{k+1}$ for the next symbol $s_{k+1}$ in the sequence.

A particular set of branches 34 interconnecting a particular combination of candidate values $c_k$ through the overall sequence of state spaces 32-1, 32-2, and 32-3 is referred to as a symbol sequence. The particular set of branches 34 interconnecting the most likely sequence of candidate values $c_k$ is identified by MLSE processing, which in FIG. 3 considers only a reduced number of possible symbol sequences because of the reduced size of each state space 32-1, 32-2, and 32-3. This reduces computational complexity, but, notably, compromises soft bit value generation as described above.

Take, for instance, soft bit value generation for the first bit $b_0$ in the second symbol $s_2$ of the example sequence. Assume for this example that the sequence estimation processing detects the second symbol $s_2$ as having the candidate value $c_2$=+3, which corresponds to the bit values $b_0$=1, $b_1$=0, and $b_2$=1 according to the symbol alphabet in FIG. 2. To generate soft bit value information for the first bit $b_0$ in the second symbol $s_2$, the processing must compare the error resulting from that detection with the error that would have resulted had it detected the second symbol $s_2$ as having a different candidate value $c_2$; namely one that has a bit value for $b_0$ that is complementary to that of the detected candidate value, $c_2=+3$. Due to the reduced state space 32-2 for the second symbol $s_2$, however, no such candidate value $c_2$ exists. Rather, the only other candidate value $c_2$ in the state space 32-2, $c_2=+1$, has a bit value for $b_0$ that matches that of $c_2=+3$. (See, for example, FIG. 2 showing $s_k=+1$ as corresponding to $b_0=1$, $b_1=0$, and $b_2=0$). The same difficulty in soft bit value generation occurs for bit value $b_1$ in the second symbol $s_2$, bit values $b_0$ and $b_1$ in the first symbol $s_1$, and bit values $b_0$ and $b_1$ in the third symbol $s_3$.

As described above, however, the demodulator 10 contemplated herein ensures that every bit value $b_0$, $b_1$, $b_2$ in each candidate value (e.g., $c_2=+3$) has a respective, but complementary bit value $\bar{b}_0, \bar{b}_1, \bar{b}_2$ in at least one other candidate value (e.g., $c_2=-1$) in the state space for a symbol (e.g., $s_2$). FIG. 4 continues the previous example with respect to the second symbol $s_2$, in order to illustrate one embodiment of the demodulator 10.

As shown in FIG. 4, the first pass demodulator 22 determines the likelihood associated with each candidate value $c_2$ in the defined set of candidate values for the second symbol $s_2$, and ranks them in order of likelihood. With the candidate values $c_2$ of the symbol $s_2$ ranked, the first pass demodulator 22 in this embodiment identifies candidate value $c_2=+3$ as the first ranked candidate value (i.e., $c_2=+3$ is more likely than all other candidate values in the defined set). Based on the ranking of candidate values $c_2$ in the defined set and the identification of $c_2=+3$ as the most likely, the state space reduction circuit 24 selects that identified candidate value $c_2=+3$ for inclusion in a reduced set. Then for each bit value $b_0,b_1,b_2$ of the identified candidate value $c_2=+3$, the state space reduction circuit 24 appends to the reduced set, if not already included therein, the highest ranked (i.e., most likely) candidate value $c_2$ among those candidate values in the defined set that have a complementary bit value $\bar{b}_0, \bar{b}_1, \bar{b}_2$.

For the first bit $b_0=1$ of the identified candidate value $c_2=+3$, for example, the candidate values in the defined set that have a complementary bit value $b_0=0$ include $c_2=-1$, $c_2=-3$, $c_2=-5$, and $c_2=-7$, as illustrated with a "Y" in the chart of FIG. 4. The highest ranked of those is $c_2=-1$, which is appended to the reduced set ($c_2=+3$, $c_2=-1$). For the next bit $b_1=0$ of $c_2=+3$, the candidate values in the defined set that have a complementary bit value $\bar{b}_1=1$ include $c_2=+5$, $c_2=-1$, $c_2=+7$, and $c_2=-3$. The highest ranked of those is $c_2=+5$, which is likewise appended to the reduced set ($c_2=+3$, $c_2=-1$, $c_2=+5$). For the final bit $b_2=1$ of $c_2=+3$, the candidate values in the defined set that have a complementary bit value $\bar{b}_2=0$ include $c_2=+1$, $c_2=+5$, $c_2=-3$, and $c_2=-7$. Again, the highest ranked of those is $c_2=+1$, which is appended to the reduced set ($c_2=+3$, $c_2=-1$, $c_2=+5$, $c_2=+1$).

The corresponding state space 42-2 for the second symbol $s_2$ in the sequence is constrained to this reduced set ($c_2=+3$, $c_2=-1$, $c_2=+5$, $c_2=+1$), as shown in FIG. 4. Still reduced as compared to the defined set, the second pass demodulator 26 considers fewer paths of possible sequences, and thereby attains reduced computational complexity. Moreover, the second pass demodulator 26 may calculate soft bit values for each bit $b_0,b_1,b_2$ of the second symbol $s_2$ as described above because each candidate value $c_2$ has a respective, but complementary bit value $\bar{b}_0, \bar{b}_1, \bar{b}_2$ in at least one other candidate value $c_2$ in the state space for the second symbol 42-2 (e.g., $c_2=-1$ has a complementary bit value for $b_0$ of $c_2=+3$, $c_2=+5$ has a complementary bit value for $b_1$ of $c_2=+3$, and $c_2=+1$ has a complementary bit value for $b_2$ of $c_2=+3$). Based on an understanding of the above example, FIG. 5 illustrates this embodiment of the demodulator 10 for one symbol 14 in the sequence 12.

Figure 5:
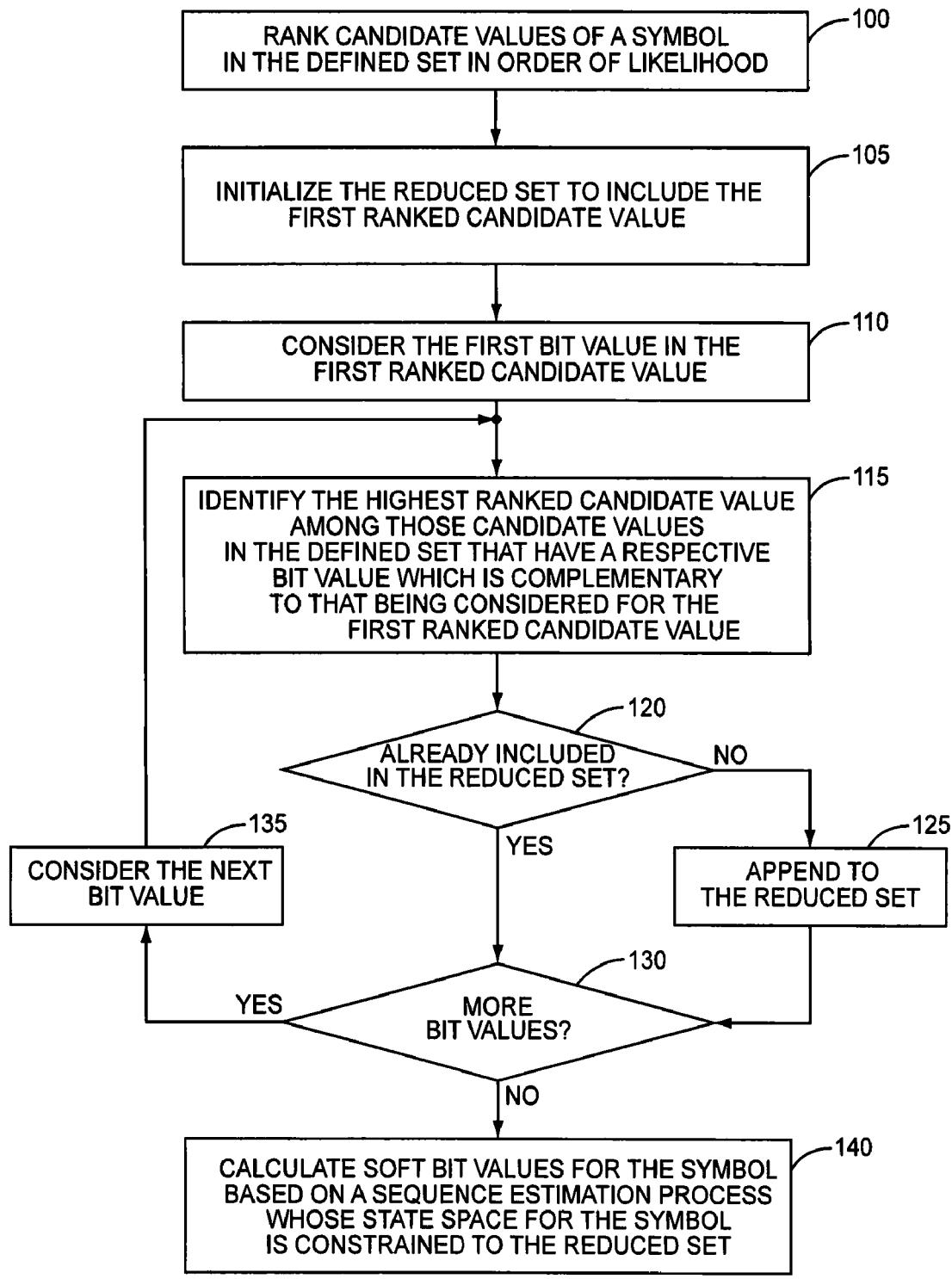
FIG. 5 is a logic flow diagram of one embodiment for soft bit value generation using constrained state spaces.

In FIG. 5, the first pass demodulator 22 ranks the candidate values of a symbol 14 in order of their likelihood (Block 100) and identifies the first ranked candidate value as the most likely (Block 110). The state space reduction circuit 24 initializes the reduced set to include that first ranked candidate value. Then, considering the first bit value in the first ranked candidate value, the state space reduction circuit 24 identifies the highest ranked candidate value among those candidate values in the defined set that have a respective, but complementary bit value (Block 115). If that candidate value is not already included in the reduced set (as determined at Block 120), the state space reduction circuit 24 appends it to the set (Block 125). Otherwise, the state space reduction circuit 24 continues this process for each bit value in the first ranked candidate value until there are no more (Blocks 130 and 135). With the formed reduced set, the second pass demodulator 26 calculates soft bit values for the symbol 14 based on a sequence estimation process whose state space for the symbol 14 is constrained to that reduced set (Block 140).

Although the state space reduction circuit 24 in the above embodiment included only one initial candidate value in the reduced set (i.e., the most likely), other embodiments herein contemplate that the reduction circuit 24 includes more than one. In this case, the state space reduction circuit 24 may identify a plurality of candidate values in the defined set, each of which are more likely than at least one other candidate value in the defined set. This number may be fixed, or adapted as a function of the candidate values' likelihood. In any case, further processing may continue in substantially the same manner as described above, wherein the state space reduction circuit 24 bases selection of additional candidate values into the reduced set on the most likely one of the plurality of candidate values identified. Of course, inclusion of more candidate values in the initial reduced set may result in fewer candidate values appended (i.e., because complementary bit values may already be represented in the set).

Those skilled in the art will appreciate that the demodulator 10 may calculate soft bit values for the bits of a symbol 14 in any manner consistent with the above description. In one embodiment, for example, the second pass demodulator 26 associates each candidate value in a symbol's corresponding reduced set with an error metric (e.g., a path metric or a branch metric based on some form of Euclidean distance evaluation). The second pass demodulator 26 then calculates a soft bit value for a bit within a symbol 14 by evaluating the difference between two error metrics. The first metric indicates the amount of error that is associated with the candidate value detected as being that of the symbol 14. The second metric is the error metric indicating the least amount of error among those associated with candidate values in the reduced set that have a bit value for the respective bit that is complementary to that of the detected candidate value.

The second pass demodulator 26 may do so by representing the soft bit value $\varphi$ for a bit $b_i$ of a symbol $s_k$ as a log-likelihood ratio, with the following discussion being based on the soft bit value $\varphi$ for the first bit $b_0$:

$$\varphi(b_0) = \log\left(\frac{Prob(b_0 \text{ in } s_k)}{Prob(\bar{b}_0 \text{ in } s_k)}\right) \quad (1)$$

where $Prob(b_0 \text{ in } s_k)$ is the probability that the first bit $b_0$ in the symbol $s_k$ is equal to 1 and $Prob(\bar{b}_0 \text{ in } s_k)$ is the probability that bit $b_0$ in the symbol $s_k$ is equal to 0 (all log functions herein are base e). So represented, the soft bit value's sign indicates the hard bit detected (i.e., a 0 or a 1), while the soft bit value's magnitude indicates the reliability of that detection. To arrive at a difference of error metrics, equation (1) may be rewritten and simplified as follows:

$$\varphi(b_0) = \log\left(\frac{\sum_{i,j} Prob(s_k = [b_0, i, j])}{\sum_{i,j} Prob(s_k = [\overline{b}_0, i, j])}\right) \quad (2)$$

$$= \log\left(\sum_{i,j} Prob(s_k = [b_0, i, j])\right) - \log\left(\sum_{i,j} Prob(s_k = [\overline{b}_0, i, j])\right) \quad (3)$$

where i and j are indices covering each candidate value in the state space of the symbol $s_k$. That is, the summation in effect includes each candidate value in the reduced set of candidate values for the symbol $s_k$. The probability of a symbol $Prob(s_k)$ may then be approximated using any form of the above described error metrics. In one embodiment, for example, the probability of a given symbol $s_k$=[x,y,z] is approximated as:

$$Prob(s_k=[x, y, z]) = e^{P(c_k=[x,y,z]) + M(c_k=[x,y,z], c'_{k+1})} \quad (4)$$

where $P(c_k=[x, y, z])$ is a path metric associated with a give candidate value $c_k=[x, y, z]$ for the symbol $s_k$, and $M(c_k=[x, y, z], c'_{k+1})$ is a branch metric between that candidate value $c_k=[x,y, z]$ and the most likely symbol transmitted at the next symbol time k+1, namely $c'_{k+1}$. Both $P(c_k=[x, y, z])$ and $M(c_k=[x, y, z], c'_{k+1})$ indicate a certain amount of error associated with a certain candidate value $c_k$, whereby a larger $P(c_k=[x, y, z])$ or $M(c_k=[x, y, z], c'_{k+1})$ indicates a lesser amount of error. Combining equations (3) and (4), the soft bit value φ for the first bit $b_0$ of the symbol $s_k$ may be written as:

$$\varphi(b_0) = \log\left(\sum_{i,j} e^{P(c_k=[b_0,i,j]) + M(c_k=[b_0,i,j], c'_{k+1})}\right) - \log\left(\sum_{i,j} e^{P(c_k=[\overline{b}_0,i,j]) + M(c_k=[\overline{b}_0,i,j], c'_{k+1})}\right) \quad (5)$$

Using the max-log algorithm approximation, namely that $\log(e^a + e^b) \approx \max(a,b)$, equation (5) may finally be written as:

$$\varphi(b_0) \approx \max_{i,j}(P(c_k = [b_0, i, j]) + M(c_k = [b_0, i, j], c'_{k+1})) - \max_{i,j}(P(c_k = [\overline{b}_0, i, j]) + M(c_k = [\overline{b}_0, i, j], c'_{k+1})) \quad (6)$$

According to equation (6), the soft bit value φ for the first bit $b_0$ of the symbol $s_k$ may be calculated as a difference between two error metrics (each of which are the sum of a path metric and a branch metric). The first error metric is the error metric indicating the least amount of error among those associated with candidate values in the reduced set that have a bit value $b_0$. The first error metric, therefore, corresponds to the error metric associated with the candidate value $c_k$ detected as being that of the symbol $s_k$. As mentioned above, the second error metric is the error metric indicating the least amount of error among those associated with candidate values in the reduced set that have a bit value for the respective bit that is complementary to that of the detected candidate value.

Figure 6:
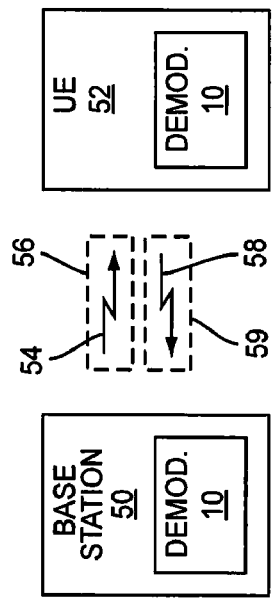
FIG. 6 is a block diagram of a wireless communication network base station and corresponding user equipment, either or both of which may be configured with demodulation circuits for soft bit value generation according to the teachings herein.

Regardless of the particular error metrics used to calculate soft bit values, those values can be particularly beneficial for received signal processing in wireless communication contexts, although the invention is not limited to such applications. FIG. 6 thus illustrates a base station 50 for use in a wireless communication network, for supporting wireless communications with a user equipment (UE) 52. The base station 50 comprises, for example, a WCDMA or other type of base station, and the UE 52 comprises a cellular radiotelephone, pager, network access card, computer, PDA, or other type of wireless communication device.

In one embodiment, the UE 52 includes an embodiment of the demodulator 10 as taught herein, for processing downlink signals 54 transmitted by the base station 50 over a time-dispersive channel 56. Additionally or alternatively, the base station 50 includes an embodiment of the demodulator 10 as taught herein, for processing uplink signals 58 transmitted by the UE over a time-dispersive channel 59, which may or may not be the same as the channel 56.

In a particular embodiment contemplated herein, the base station 50 comprises an LTE base station (i.e., it is configured for operation in a wireless communication network configured according to the Long Term Evolution standards promulgated by the 3GPP). The complementary pairing of a first pass demodulation and corresponding constrained sequence estimation processing as taught herein thus is applied to the LTE uplink. The format of this uplink can be viewed as a special form of single-carrier transmission involving the use of a cyclic prefix. Because the constrained sequence estimation processing taught herein generally considers only a small subset of the overall number of possible symbol values, its complexity is greatly reduced.

Figure 7:
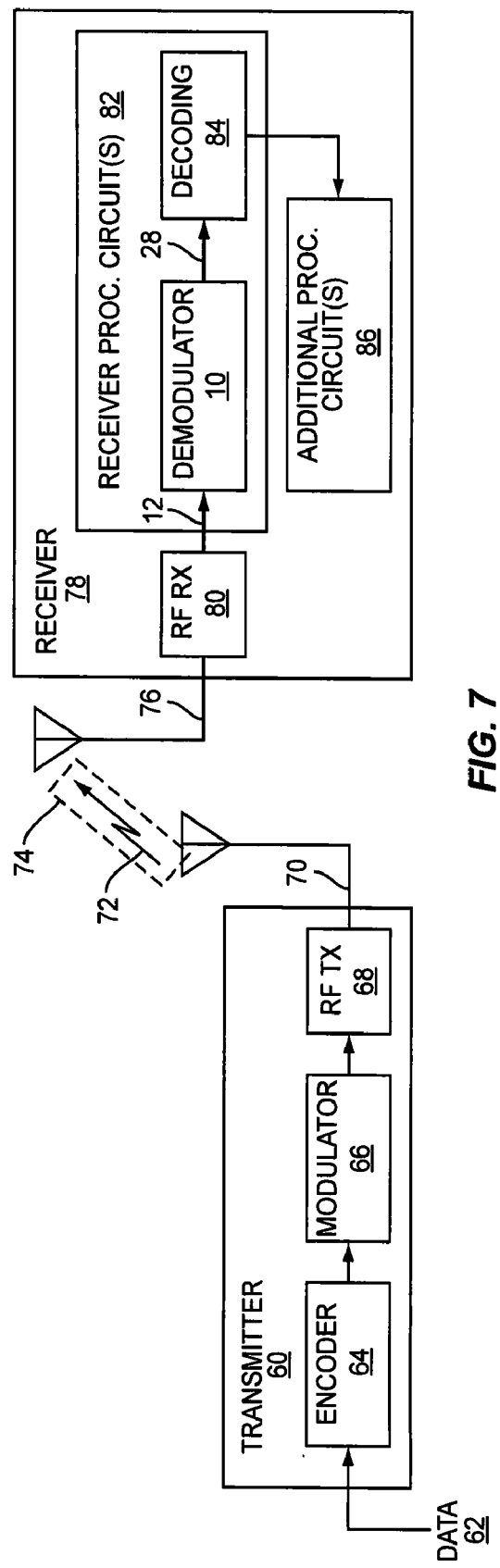
FIG. 7 is a block diagram of one embodiment of a transmitter and receiver, where the receiver is configured with demodulation circuits for soft bit value generation according to the teachings herein.

FIG. 7 provides a more detailed but non-limiting transmitter/receiver example, which provides a basis for more detailed discussion of one or more embodiments of the demodulator 10. At a transmitter 60, information symbols 62 are optionally encoded using a forward-error-correction (FEC) encoder 64, such as a convolutional encoder or turbo-code encoder. The resulting modem bits are provided to a modulator 66, where modem symbols are formed (e.g. QPSK, 16-QAM) and used to modulate spreading waveforms. These spreading waveforms are then modulated onto a radio carrier in RF transmit circuits 68, and transmitted on one or more transmit antennas 70. The transmitted signal 72 passes through a transmission medium 74, such as a multipath fading channel, and arrives at one or more receive antennas 76 at a receiver 78. The received signals are processed by a front-end RF circuit 80, which mixes them down to baseband and digitizes them to form a baseband signal that, in this embodiment, represents the earlier identified received signal 12. The received signal values comprising the received signal 12 thus represent or otherwise convey a given sequence 12 of symbols 14.

Receiver processing circuits 82 include an embodiment of the demodulator 10, which may be configured to process the received signal 12 on a per-symbol. In particular, as taught herein, the demodulator 10 applies a first pass demodulation process to the received signal 12 to identify candidate symbol values for the received signal 12, and then applies a second pass demodulation process to the received signal 12 to detect the actual sequence of received symbols in the received signal 12, wherein the state spaces used by the sequence estimation process are constrained to the reduced set of candidate values formed by the state space reduction circuit 24. In doing so, the second pass demodulation process generates soft bit values 28 for the symbol sequence 14.

The soft bit values 28 are output by the demodulator 10 input to a decoding circuit 84, which decodes the detected symbols based on the provided soft bit values 28 to recover the originally transmitted information. The decoding circuit 84 outputs such information to one or more additional processing circuits 86, for further operations. The nature of the additional processing circuits varies with the intended function or purpose of the receiver 78, e.g., base station circuit, mobile terminal circuit, etc., and it should be understood more generally that the illustrated architecture of the receiver 78 is non-limiting.

Figure 8:
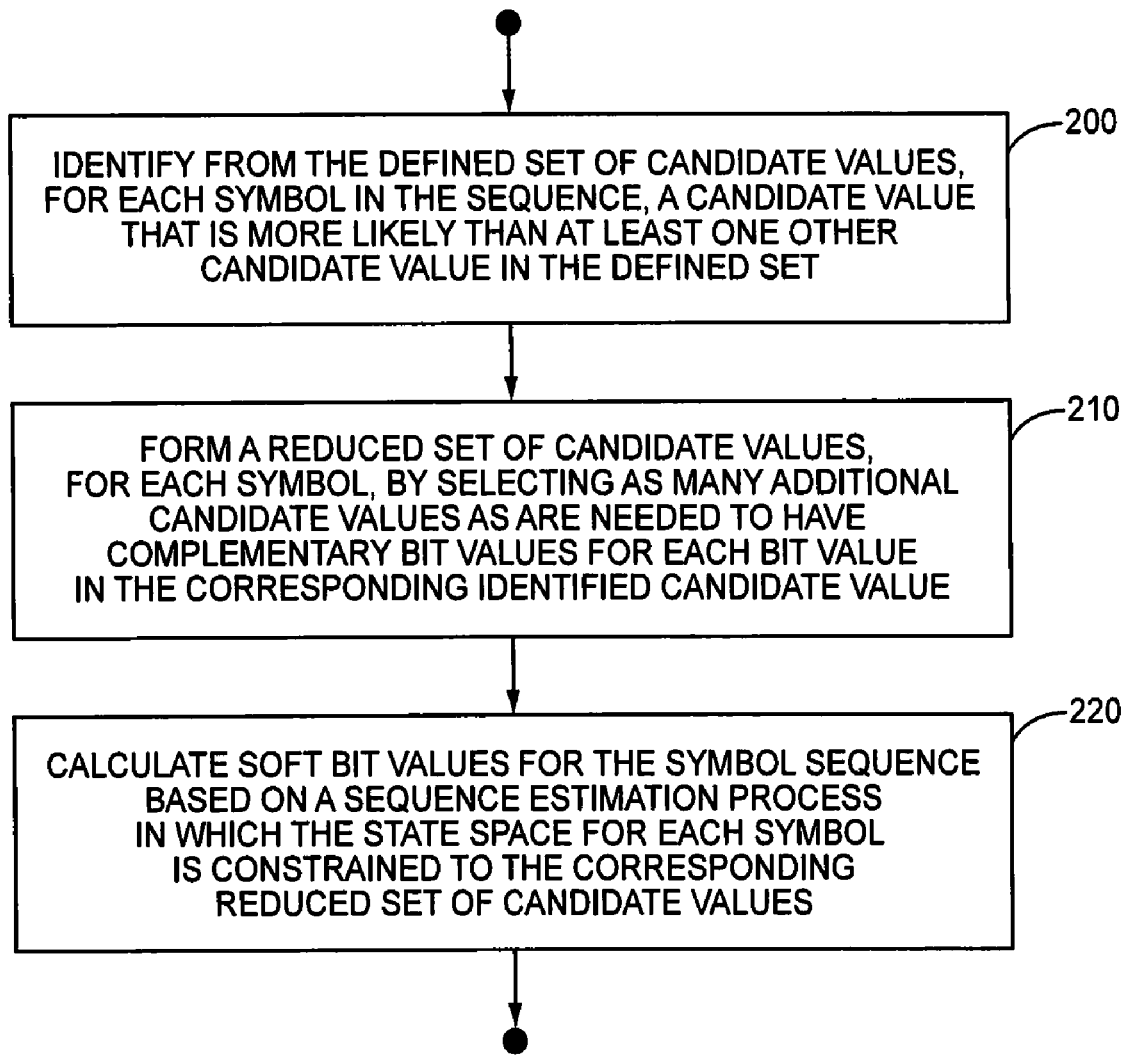
FIG. 8 is a logic flow diagram of another embodiment for soft bit value generation using constrained state spaces.

With the above points of variation and implementation of the demodulator 10 in mind, those skilled in the art will appreciate that the demodulator 10 of the present invention generally performs the method illustrated in FIG. 8. According to FIG. 8, the first pass demodulator 22 identifies from the defined set of candidate values, for each symbol 14 in the sequence 12, a candidate value that is more likely than at least one other candidate value in the defined set (Block 200). The state space reduction circuit 24 forms a reduced set of candidate values, for each symbol 14, by selecting as many additional candidate values as are needed to have complementary bit values for each bit value in the corresponding identified candidate value (Block 210). The second pass demodulator 26 then calculates soft bit values 28 for the symbol sequence 12 based on a sequence estimation process in which the state space for each symbol 14 is constrained to the corresponding reduced set of candidate values (Block 220).

It should be understood, however, that the foregoing description and the accompanying drawings represent non-limiting examples of the methods and individual apparatuses taught herein. As such, the present invention is not limited by the foregoing description and accompanying drawings. Instead, the present invention is limited only by the following claims and their legal equivalents.

What is claimed is:

1. A method implemented by a demodulator for generating soft bit values for a symbol sequence in a received signal comprising:
   identifying from a defined set of candidate values, for each symbol in the symbol sequence, a candidate value that is more likely than at least one other candidate value in the defined set;
   forming a reduced set of candidate values, for each symbol, by selecting as many additional candidate values from the defined set as are needed to have complementary bit values for each bit value in the corresponding identified candidate value; and
   calculating soft bit values for the symbol sequence based on a sequence estimation process in which the state space for each symbol in the symbol sequence is constrained to the corresponding reduced set of candidate values.

2. The method of claim 1 further comprising, for each symbol, determining a likelihood associated with each candidate value in the defined set and ranking those candidate values in order of likelihood.

3. The method of claim 1 wherein forming a reduced set of candidate values, for each symbol, comprises:
   selecting the corresponding identified candidate value for inclusion in the reduced set; and
   for each bit value in the corresponding identified candidate value, appending to the reduced set the most likely candidate value among those candidate values in the defined set that have a complementary bit value.

4. The method of claim 1 wherein identifying, for each symbol, a candidate value that is more likely than at least one other candidate value in the defined set comprises identifying a candidate value that is more likely than all other candidate values in the defined set.

5. The method of claim 1 wherein identifying, for each symbol, a candidate value that is more likely than at least one other candidate value in the defined set comprises identifying a plurality of candidate values in the defined set, each of which are more likely than at least one other candidate value in the defined set, and wherein forming a reduced set of candidate values comprises selecting as many additional candidate values from the defined set as are needed to have complementary bit values for each bit value in the most likely one of the plurality of candidate values identified.

6. The method of claim 5 further comprising adapting the number of candidate values identified as a function of their likelihood.

7. The method of claim 1 wherein identifying, for each symbol, a candidate value that is more likely than at least one other candidate value in the defined set comprises performing a linear equalization-based demodulation process or a decision feedback equalization-based demodulation process to, for each symbol, determine a likelihood associated with each candidate value in the defined set and rank those candidate values in order of likelihood, and wherein calculating soft bit values for the symbol sequence comprises performing a non-linear equalization-based demodulation process.

8. The method of claim 1 further comprising, for each symbol in the sequence, detecting which one of the candidate values in the corresponding reduced set is that of the symbol, and wherein calculating soft bit values for the symbol sequence comprises, for each bit within a symbol, evaluating the difference between a first and second error metric in a trellis, the first error metric indicating the amount of error associated with the candidate value detected as being that of the symbol, and the second error metric being the metric indicating the least amount of error among those associated with candidate values in the reduced set that have a bit value for the respective bit that is complementary to that of the candidate value detected.

9. The method of claim 8 wherein the first and second error metric each comprise the addition of a path metric associated with the symbol and a branch metric associated with the symbol transmitted next in the sequence.

10. A demodulator configured to generate soft bit values for a symbol sequence in a received signal, comprising:
    a first pass demodulator configured to identify from a defined set of candidate values, for each symbol in the symbol sequence, a candidate value that is more likely than at least one other candidate value in the defined set;
    a state space reduction circuit configured to form a reduced set of candidate values, for each symbol, by selecting as many additional candidate values from the defined set as are needed to have complementary bit values for each bit value in the corresponding identified candidate value; and
    a second pass demodulator configured to calculate soft bit values for the symbol sequence based on a sequence estimation process in which the state space for each symbol in the symbol sequence is constrained to the corresponding reduced set of candidate values.

11. The demodulator of claim 10 wherein the first pass demodulator is further configured to, for each symbol, determine a likelihood associated with each candidate value in the defined set and rank those candidate values in order of likelihood.

12. The demodulator of claim 10 wherein the state space reduction circuit is configured to form a reduced set of candidate values, for each symbol, by:
- selecting the corresponding identified candidate value for inclusion in the reduced set; and
- for each bit value in the corresponding identified candidate value, appending to the reduced set the most likely candidate value among those candidate values in the defined set that have a complementary bit value.

13. The demodulator of claim 10 wherein the first pass demodulator is configured to identify, for each symbol, a candidate value that is more likely than all other candidate values in the defined set.

14. The demodulator of claim 10 wherein the first pass demodulator is configured to identify, for each symbol, a plurality of candidate values in the defined set, each of which are more likely than at least one other candidate value in the defined set, and wherein the state space reduction circuit is configured to form a reduced set by selecting as many additional candidate values from the defined set as are needed to have complementary bit values for each bit value in the most likely one of the plurality of candidate values identified.

15. The demodulator of claim 14 wherein the first pass demodulator is further configured to adapt the number of candidate values identified as a function of their likelihood.

16. The demodulator of claim 10 wherein the first pass demodulator is configured to perform a linear equalization-based demodulation process or a decision feedback equalization-based demodulation process to, for each symbol, determine the likelihood associated with each candidate value in the defined set and to rank those candidate values in order of likelihood, and wherein the second pass demodulator is configured to calculate soft bit values for the symbol sequence by performing non-linear equalization-based demodulation process.

17. The demodulator of claim 10 wherein the second pass demodulator is further configured to, for each symbol in the sequence, detect which one of the candidate values in the corresponding reduced set is that of the symbol, and wherein the second pass demodulator is configured to calculate soft bit values for the symbol sequence by, for each bit within a symbol, evaluating the difference between a first and second error metric in a trellis, the first error metric indicating the amount of error associated with the candidate value detected as being that of the symbol, and the second error metric being the metric indicating the least amount of error among those associated with candidate values in the reduced set that have a bit value for the respective bit that is complementary to that of the candidate value detected.

18. The demodulator of claim 17 wherein the first and second error metric each comprise the addition of a path metric associated with the symbol and a branch metric associated with the symbol transmitted next in the sequence.

* * * * *

UNITED STATES PATENT AND TRADEMARK OFFICE
CERTIFICATE OF CORRECTION

PATENT NO. : 8,223,896 B2  
APPLICATION NO. : 12/510537  
DATED : July 17, 2012  
INVENTOR(S) : Zangi et al.

It is certified that error appears in the above-identified patent and that said Letters Patent is hereby corrected as shown below:

In Column 4, Line 36, delete "defined" and insert -- defined set of --, therefor.

In Column 5, Line 41, delete " $b_0 = 0$ " and insert -- $\bar{b}_0 = 0$ --, therefor.

Signed and Sealed this  
Second Day of October, 2012

David J. Kappos  
*Director of the United States Patent and Trademark Office*